(12) United States Patent
Farr

(10) Patent No.: US 7,422,377 B2
(45) Date of Patent: **\*Sep. 9, 2008**

(54) MICRO-MODULE WITH MICRO-LENS

(75) Inventor: Mina Farr, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 10/882,448

(22) Filed: Jun. 30, 2004

(65) Prior Publication Data

US 2004/0264856 A1    Dec. 30, 2004

Related U.S. Application Data

(60) Provisional application No. 60/483,741, filed on Jun. 30, 2003.

(51) Int. Cl.
*G02B 6/36* (2006.01)
(52) U.S. Cl. .............................. 385/92; 385/76; 385/93
(58) Field of Classification Search ................. 372/101; 385/92–93, 76
See application file for complete search history.

(56) References Cited

U.S. PATENT DOCUMENTS

| | | | |
|---|---|---|---|
| 3,725,817 A | | 4/1973 | Nolan |
| 4,156,206 A | * | 5/1979 | Comerford et al. .......... 372/108 |
| 4,583,227 A | | 4/1986 | Kirkby |
| 4,716,568 A | | 12/1987 | Scifres et al. |
| 4,991,921 A | | 2/1991 | Suzuki et al. |
| 4,998,256 A | * | 3/1991 | Ohshima et al. ............... 372/32 |
| 5,127,072 A | * | 6/1992 | Blauvelt et al. ............... 385/88 |
| 5,319,435 A | | 6/1994 | Melle et al. |
| 5,469,265 A | | 11/1995 | Measures et al. |
| 5,561,684 A | | 10/1996 | Martin |
| 5,668,825 A | | 9/1997 | Karpinski |
| 5,751,877 A | * | 5/1998 | Ishizaka et al. ............... 385/93 |
| 5,812,581 A | | 9/1998 | Cox |
| 5,845,031 A | * | 12/1998 | Aoki ........................... 385/92 |
| 5,854,867 A | * | 12/1998 | Lee et al. ...................... 385/49 |
| 5,963,686 A | | 10/1999 | Zheng et al. |
| 5,978,401 A | | 11/1999 | Morgan |
| 6,101,210 A | * | 8/2000 | Bestwick et al. .............. 372/96 |
| 6,122,301 A | | 9/2000 | Tei et al. |
| 6,289,028 B1 | | 9/2001 | Munks et al. |

(Continued)

FOREIGN PATENT DOCUMENTS

JP    2002328204 A  * 11/2002

*Primary Examiner*—Minsun Harvey
*Assistant Examiner*—Phillip Nguyen
(74) *Attorney, Agent, or Firm*—Workman Nydegger

(57) ABSTRACT

Optical micro-modules include an integrated lens holder and microlens for passive coupling of optical signals into an optical fiber. The microlens includes a mounting surface and a curved section having an optical axis. The microlens curved section may be an aspheric silicon lens. The microlens mounting surface is attached to the lens holder mounting surface such that the microlens optical axis is centered with the optical fiber and aligned at a desired focal length from the optical fiber. The lens holder may, for example, be either in mechanical communication with a cable receptacle or be attached to a submount that has a silicon v-groove thereon for receiving an optical fiber. The optical micro-module may be part of other optical devices, for example a transmitter optical sub-assembly or a receiver optical sub-assembly.

6 Claims, 9 Drawing Sheets

U.S. PATENT DOCUMENTS

| | | |
|---|---|---|
| 6,366,592 B1 | 4/2002 | Flanders |
| 6,513,991 B1 * | 2/2003 | Kowalski .................... 385/92 |
| 6,545,826 B2 * | 4/2003 | Horwitz et al. ............ 359/820 |
| 6,587,214 B1 | 7/2003 | Munks |
| 6,647,038 B2 * | 11/2003 | Althaus et al. ............... 372/36 |
| 6,721,511 B1 * | 4/2004 | Tatsuno et al. ............. 398/141 |
| 6,808,316 B2 * | 10/2004 | Nakanishi et al. ............ 385/88 |
| 6,869,231 B2 * | 3/2005 | Chiu et al. .................... 385/93 |
| 7,021,832 B2 * | 4/2006 | Fukuoka ..................... 385/67 |
| 7,023,626 B1 | 4/2006 | Oliva |
| 2001/0038498 A1 * | 11/2001 | Furuhashi et al. ........... 359/819 |
| 2002/0001321 A1 | 1/2002 | Perry |
| 2002/0048297 A1 * | 4/2002 | Irie et al. ...................... 372/36 |
| 2002/0085596 A1 * | 7/2002 | Irie et al. ...................... 372/36 |
| 2002/0141463 A1 | 10/2002 | Bruun-Larsen et al. |
| 2003/0053169 A1 * | 3/2003 | Nasu et al. .................. 359/133 |
| 2004/0047389 A1 | 3/2004 | Cannon et al. |
| 2005/0063649 A1 * | 3/2005 | Fukuda et al. ................ 385/92 |

* cited by examiner

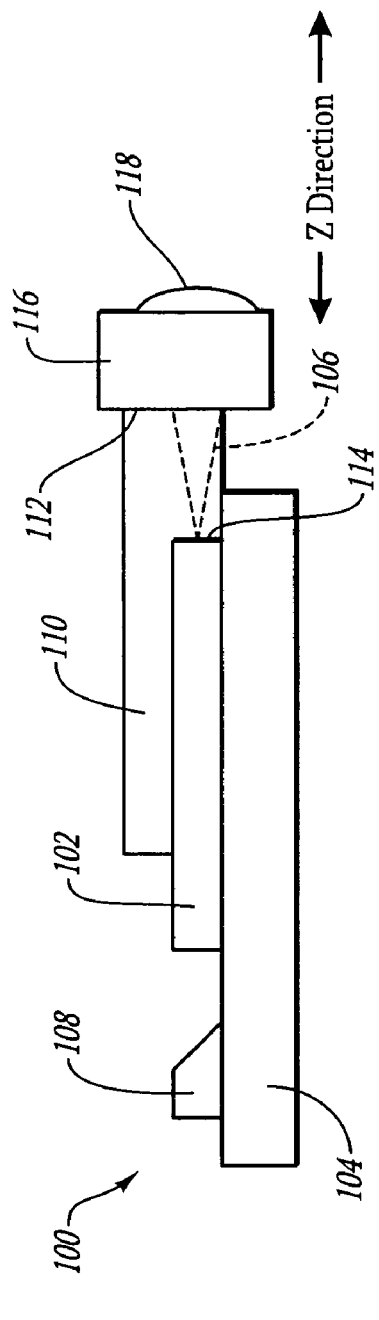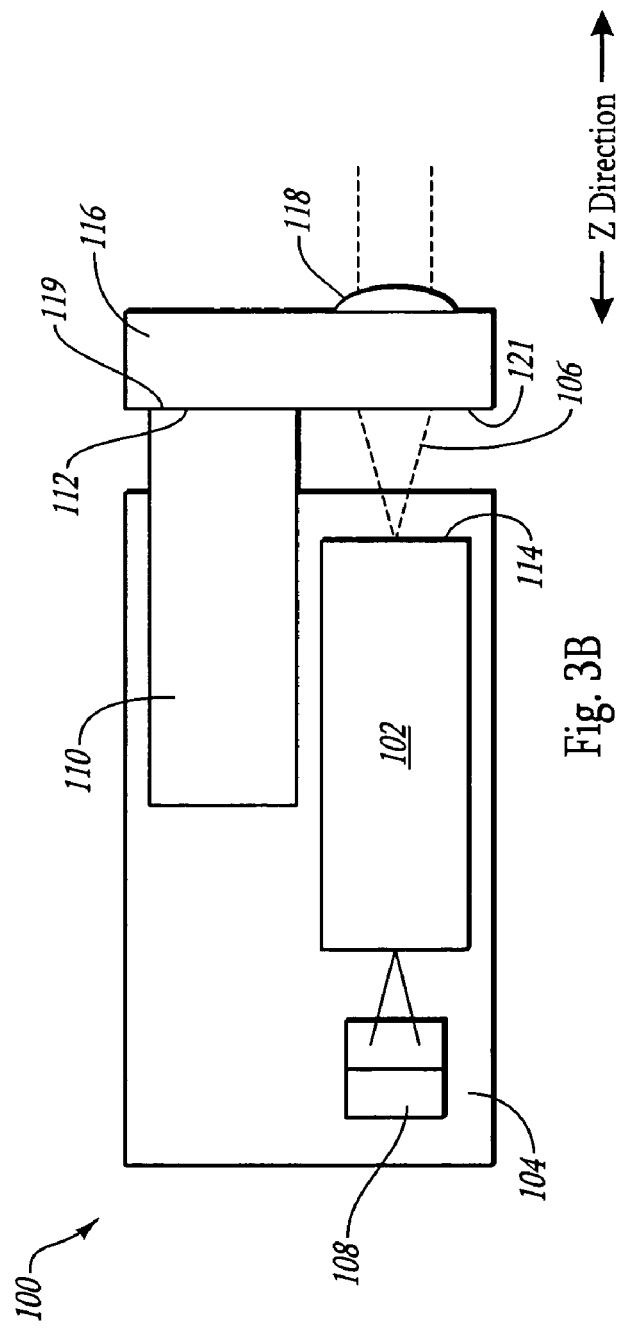
Fig. 3A
Fig. 3B

MICRO-MODULE WITH MICRO-LENS

CROSS-REFERENCE TO RELATED APPLICATIONS

This application claims the benefit of U.S. Provisional Application No. 60/483,741, filed Jun. 30, 2003, which is hereby incorporated herein by reference.

BACKGROUND OF THE INVENTION

1. The Field of the Invention

The present invention relates generally to high speed data transmission systems. More particularly, embodiments of the invention relate to optical micro-modules for use in optical transmitters and passive optical signal propagation devices.

2. The Relevant Technology

The use of fiber optic technology is an increasingly important method of data transmission. Through fiber optics, digital data in the form of light signals is formed by light emitting diodes or lasers and then propagated through a fiber optic cable. Such light signals allow for high data transmission rates and high bandwidth capabilities. Other advantages of using light signals for data transmission include their resistance to electromagnetic radiation that interferes with electrical signals; fiber optic cables' ability to prevent light signals from escaping, as can occur electrical signals in wire-based systems; and light signals' ability to be transmitted over great distances without the signal loss typically associated with electrical signals on copper wire.

Many fiber optic components are capable of splitting, redirecting, relaying, multiplexing, demultiplexing, or otherwise manipulating light signals without the need for electrical input. Such optical components are typically referred to as passive devices in that they do not require a source of energy for their operation. Common examples include optical fibers, lenses, and filters.

However, it is often necessary to connect an electrical signal to a light signal and vice versa. One conventional device used to translate electrical signals into light signals is a transmitter optical subassembly (TOSA). TOSAs typically include an electrical interface for receiving electrical signals; a data encoder/modulator for converting the electrical signals into FM, AM, or digital optical signals, and a light emitting diode or laser to form the light signal. After the light signal leaves the light emitting diode or laser it typically passes through one or more isolators and lenses used to couple the light signal with an optical waveguide, such as a fiber optic cable. Each of the light emitter, isolator(s), and lens(es) are typically structurally distinct and isolated within a TOSA housing.

Similarly, receiver optical subassemblies are used to translate optical signals into electrical signals. One such device is a receiver optical subassembly (ROSA). A typical ROSA may comprise, for example, an optical fiber receptacle and an avalanche photodiode (APD), which operates with a reverse-bias voltage that causes the primary photocurrent to undergo amplification by cumulative multiplication of charge carriers. Typically, the light exiting an optical fiber in the optical fiber receptacle is so divergent that it needs to be collimated or otherwise focused onto the photodiode.

Because of the small size of the various components in optical devices, such as TOSAs, ROSAs, and passive optical devices that couple light signals into optical fibers, and the importance of precisely aligning the components, the optical devices can be relatively difficult and expensive to manufacture. For example, one important passive component typically used to passively couple light signals into an optical fiber is an aspherical glass lens. These aspherical molded glass lenses focus or collimate the light received from a light source, for example a laser diode. These glass lenses typically have an aspheric surface on each side and must be carefully aligned at the proper focal length from the light source and from the optical fiber during the manufacture of the optical device. As a result, both because of their individual cost and the added cost in manufacturing optical devices, glass aspheric lenses add a considerable cost to optical devices.

Accordingly, there is a continuing need for less expensive and more easily assembled and aligned passive devices for use in optical devices to propagate and otherwise manipulate optical signals.

SUMMARY OF EMBODIMENTS OF THE INVENTION

Embodiments of the invention are concerned with micro-modules for passive coupling of optical signals to and from optical fibers as well as methods of manufacturing the micro-modules. More particularly, the herein disclosed micro-modules use a lens holder to secure an integrated lens at a desired focal length from, and along a desired optical axis with, an optical fiber or optical fiber receptacle.

Various embodiments of the invention can be used with passive optical assemblies, which are generally defined as devices that do not require a source of energy for their operation, to couple optical signals between optical fibers or other devices. Other exemplary embodiments of the invention can be used with transmitter assemblies as optical signals are created by light emitters and coupled into an optical fiber with the assistance of the herein disclosed micro-modules with integrated lenses. Yet other specific embodiments of the invention may be used with receiver optical assemblies as diverging optical signals exiting an optical fiber are received by the integrated lenses, collimated, and directed towards additional devices in the receiver optical assemblies.

The micro-modules can be manufactured, for example, at the wafer scale level with numerous pairs of lens holders positioned on a submount, such as a silicon wafer. Through a series of additional processing steps described herein a number of optical micro-modules, each having an integrated microlens, can be quickly and efficiently manufactured for assembly into a larger device. During the assembly process, the optical axis of each microlens is precisely aligned with a future optical fiber terminus location to ensure an efficient coupling of light into the optical fiber. Similarly, the optical axis alignment ensures that light received from the optical fiber is in turn formed into a more symmetric beam with better static alignment. The lens is also adjusted in the z-axis to either focus or collimate the beam as desired. Thus, embodiments of the present invention allow wafer scale alignment rather than the conventional device level alignment, thus eliminating or simplifying the device level alignment and thereby lowering costs. By way of example, since the microlenses are made in a parallel wafer scale production, the cost of each lens could be a fraction of a dollar. In contrast, molded glass aspheric lenses generally cost over ten dollars.

Accordingly, a first exemplary embodiment of the invention is an optical micro-module including a submount which has an optical fiber mounted thereon. A lens holder having a mounting surface is attached to the submount. A lens having a mounting surface and a curved section is in turn attached to the lens holder such that a lens optical axis is aligned with the optical fiber and the lens surface is at a desired focal length from the optical fiber.

Another embodiment of the invention is a transmitter optical subassembly which includes a light emitter and a submount in mechanical communication with an optical fiber receptacle. A lens holder having a mounting surface is attached to the submount. A microlens including a mounting surface and a curved section is attached to the lens holder mounting surface at the microlens mounting surface. The microlens optical axis and lens surface are thereby aligned with the optical fiber receptacle such that, when an optical fiber is connected to the optical fiber receptacle, an optical signal can be effectively created by the light emitter, received by the microlens, and coupled into the optical fiber.

According to another exemplary embodiment of the invention, a transmitter optical micro-module includes a transmitter sub-module and a light coupling sub-module. The transmitter sub-module includes a light emitter mounted upon a substrate and a lens holder mounted upon the substrate adjacent the light emitter, the lens holder having a mounting surface. A lens, for receiving and collimating an optical signal from the light emitter, is attached to the mounting surface of the lens holder at a desired focal length from the light emitter. The light coupling sub-module includes a submount in mechanical communication with an optical fiber receptacle and a lens holder attached to the submount. A microlens, including a mounting surface and a curved section having an optical axis, is attached to the lens holder at its mounting surface such that the microlens optical axis is aligned with the optical fiber receptacle.

An exemplary method of forming a micro-module according to the invention includes providing a substrate having at least one micro-module submount. Each submount includes a top surface and at least one additional surface with each top surface including at least one silicon v-groove for receiving an optical fiber (or a short fiber stub) such that the optical fiber, when attached, will have a predetermined terminus. A microlens having a mounting surface and a curved section having a known curvature is provided. A lens holder is mounted to the at least one additional surface of the submount at a position selected based upon the curvature of the microlens. The microlens optical axis is thus aligned with a corresponding silicon v-groove and attached to the lens holder. Thus, the microlens is aligned at a desired focal length from the optical fiber terminus by the position of the lens holder. Finally, the substrate is separated into individual micro-modules.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3A is a further schematic diagram that illustrates aspects of an optical micro-module according to embodiments of the invention.

FIG. 3B is another schematic diagram that illustrates aspects of an optical micro-module according to embodiments of the invention.

DETAILED DESCRIPTION OF THE INVENTION

Figure 1:
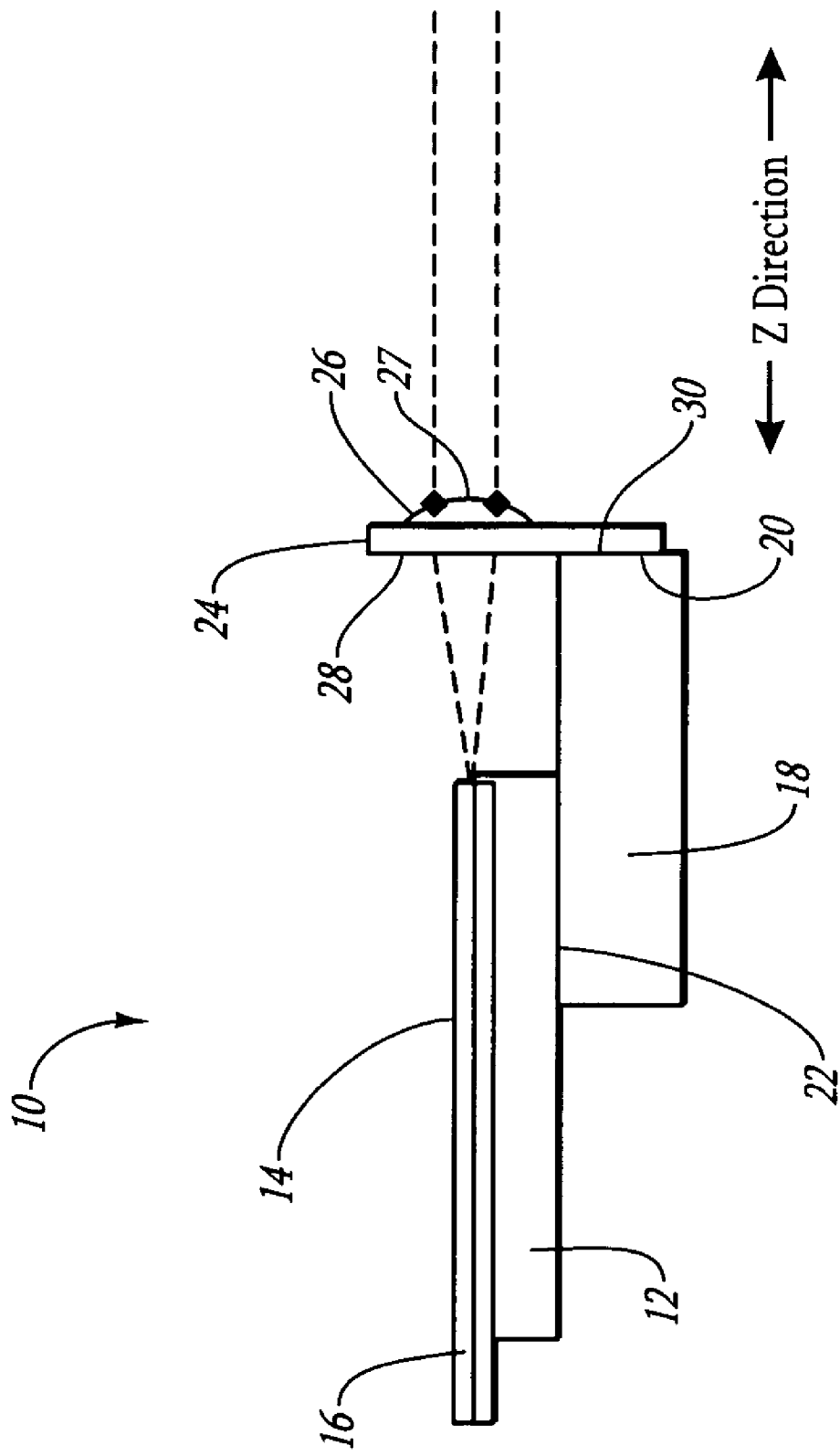
FIG. 1 is a schematic diagram that illustrates aspects of an optical micro-module according to embodiments of the invention.

In general, embodiments of the invention are concerned with micro-modules for passive or transmitted coupling of optical signals to and from optical fibers. More particularly, the herein disclosed micro-modules use a lens holder to affix an integrated microlens at a desired focal length from an optical fiber or other optical device.

Generally, embodiments of the invention can also be used with passive optical assemblies, which are generally defined as devices that do not require a source of energy for their operation. Such passive optical assemblies may, for example, couple an optical signal between optical fibers. Other embodiments of the invention can be used with transmitter assemblies as optical signals are created by light emitters and coupled into an optical fiber with the assistance of the herein disclosed micro-modules with integrated microlenses. Yet other embodiments of the invention may be used with receiver optical assemblies as diverging optical signals exiting an optical fiber are received by the integrated microlenses, collimated, and directed towards additional devices in the receiver optical assemblies.

The micro-modules can be manufactured at the wafer scale level with numerous pairs of lens holders positioned on a submount, such as a silicon wafer. Through a series of additional processing steps described below a number of optical micro-modules, each having an integrated microlens, can be quickly and efficiently manufactured for assembly into a larger device.

As used herein, the term optical axis refers to the optical centerline for a lens system. Thus, in a transmitter optical sub-assembly, the optical axis ideally is the line that commences at the emission point of a light emitter, passes through the center of curvature of the optical surface(s) of a lens, and reaches the center axis of a receiving optical fiber. Also as used herein, the term "z-axis" refers to the axis parallel with a line extending from a selected lens surface to a light emitter, such as a laser diode or optical fiber, or light receiver, such as an optical fiber or photodiode.

During the assembly process, the optical axis of the lens is precisely aligned with an optical fiber or a light emitter's emission point. In the case of coupling light into an optical fiber, this ensures an efficient coupling of the light into the optical fiber. In the case of the light emitter, the optical axis alignment ensures a more symmetric beam with better static alignment. The lens is also adjusted in the z-axis to either focus or collimate the beam as desired. Because many conventional optical devices do not include a lens holder that is attached to the optical fiber's submount, such conventional optical devices require a complicated device level process to properly align the lens, both as to its optical axis and along the z-axis. In contrast, embodiments of the present invention allow wafer scale alignment rather than the conventional device level alignment, thus eliminating or simplifying the device level alignment and thereby lowering costs.

Other presently recognized advantages of embodiments of the invention include: the relatively low cost of using a mass produced silicon microlens; superior lens performance (optical aberrations scale down with size of the lens), the excellent alignment tolerances (microlens to laser and microlens to optical fiber); the applicability of embodiments of the present invention to a variety of TOSA platforms, including for example, cooled, uncooled, EML, butterfly, and the like; improved isolator or quarter waveplate performance due to the collimating effects of the microlens; and the application of the present invention to passives collimated geometry.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of optical systems have not been described in particular detail in order to avoid unnecessarily obscuring the present invention.

Reference is first made to FIG. 1, which presents a passive micro-module according to one embodiment of the invention, designated generally at 10. In the depicted embodiment micro-module 10 includes a silicon submount 12, which has a silicon v-groove 14 on a first surface thereof for receiving an optical fiber 16. Of course, one skilled in the art will recognize that various embodiments of the invention may have differing details, including different methods of production, and may therefore not necessarily require the submount to be formed of silicon. Therefore, as used herein, the term "submount" refers to one or more layers or structures, either monolithic or including active or operable portions of electronic or optical devices. For simplicity in describing the present invention and to avoid obscuring other aspects of the invention, however, the submount of the present invention designated at 12 in FIG. 1 will be referred to as silicon submount 12.

Lens holder 18 is attached to submount 12 at submount attachment surface 22. The positioning of lens holder 18 provides the proper focal length between optical fiber 16 and microlens 24 through its z-axis positioning. This is accomplished by aligning lens holder 18 so that the lens holder has a mounting surface 20 at a selected distance from optical fiber 16. Thus, the z-axis alignment of microlens 24 is provided during assembly of micro-module 10 and thereby eliminates, or reduces, the requirement for later z-axis alignment for microlens 24. Because the curvature of each microlens varies, the z-axis alignment of each lens holder is customized for the curvature variance in individual lenses. The curvature of each microlens is therefore measured before the assembly of the microlens subassemblies.

One preferred embodiment of microlens 24 is formed as part of an aspheric microlens array by fabrication techniques that are known in the art. In the reflow process, for example, polymeric materials are patterned on substrates and then melted on the polymer to form ideal spherical surfaces. These patterns are then transferred into the substrate by various plasma etching techniques. One such microlens fabrication technique involves forming squat cylinders of photoresist on a silicon substrate using conventional lithography. The substrate is then heated above the glass reflow temperature of the photoresist, allowing it to reflow. This creates a series of spheric surfaces, each with a radius that may be predicted from the volume of resist and the area of contact with the substrate.

The lens profiles are then transferred into the substrate material, often with 1:1 selectivity and adjusted for the asphericity required in the design. This is performed as a high frequency, high power signal is inductively coupled into a vacuum chamber containing reactive gases at low pressure to form a high-density plasma. The substrate to be etched is mounted on a driven stage remotely from the plasma generation region. The bias on the stage is controlled by applying a second RF signal at a different frequency and the substrate is etched.

Such inductively coupled plasma dry etch tools allow control of selectivity between the substrate and a photoresist mask, permitting adjustment of lens properties and aspheric coefficients. Lenses produced by the foregoing method can have a wide range of design parameters over a wide range of numerical apertures, including aspheric design over a broad range of conic values. Microlenses can be formed in InP, GaP, quartz and silicon, for example, although silicon is presently preferred.

As depicted in FIG. 1, microlens 24 may have a rectangular shape with a light transmitting portion having a curved section 26 of the lens at one end of microlens 24 and a mounting surface 30 at the opposing end of microlens 24. In the depicted embodiment the microlens has a curved section 26 on only one surface thereof, with an opposing flat surface 28. Curved section 26 is an aspheric curve having a center of curvature 27 that is aligned along the optical axis, or emission point, of the light emitter. In various embodiments, the light transmitting portion of microlens 24 also has an antireflective coating applied on each of curved section 26 and opposing flat surface 28. Thus, mounting surface 30 of microlens 24 is attached to lens holder 18 while curved section 26 of microlens 24 is aligned with optical fiber 16 and has an antireflective coating thereon. Attachment of microlens 24 to lens holder 18 can be enhanced by attaching a metal coating to mounting surface 30 of microlens 24, which can be effectively soldered or otherwise affixed to lens holder 18.

Microlens 24 may either receive and collimate a light signal from, or couple a light signal into, optical fiber 16, depending upon the direction of light traveling through optical fiber 16. Further, the z-axis alignment is individualized for each microlens 24 by measuring the radius of curvature of each microlens curved section 26 and calculating the corresponding focal length, or z distance. Preferably, each microlens is measured and a map of each lens's focal lengths is provided prior to the assembly of the optical subassembly.

In addition, one or more optical components such as: narrow band, broad band, and edge response filters; waveplates; or isolators, such as a micro isolator, may receive the light signal prior to its introduction into the optical fiber.

By way of example only, the curved section of a microlens is formed of silicon and has a diameter of about 500 microns, a thickness of about 250 microns, a radius of curvature of about 710 microns plus or minus about 35 microns, a conic constant of about −2 to −4, plus or minus about 0.5, and a clear aperture of about 450 microns. The lenses may be manufactured at a lens array pitch of about 1000 microns along rows and about 600 to about 1,000 microns along columns. The metal coating may formed of, for example, a 50 nm titanium layer, a 100 nm platinum layer, or a AuSn 1800 alloy layer in a 70:30 or 80:20 ratio. The metal coating preferably has a surface area of about 500 microns by about 400 microns. The lens antireflective coating may comprise, for example, a single layer nitride (transmission>97%) or a high temperature tolerant multi-layer coating (transmission>99%).

Figure 2:
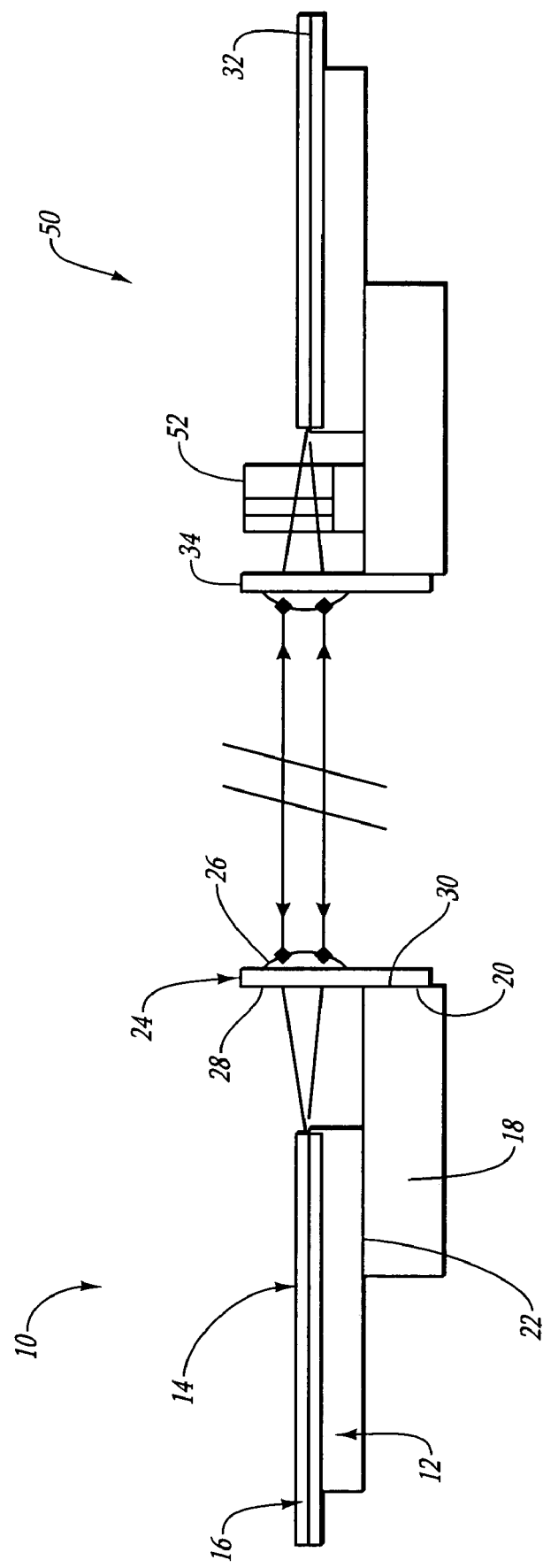
FIG. 2 is yet another schematic diagram that illustrates aspects of an optical micro-module according to embodiments of the invention.

Referring now to FIG. 2, passive micro-module 10 may be used in line with a second passive micro-module 50 as part of a passive optical fiber to optical fiber coupling. As illustrated, light may be passively emitted from either optical fiber 16 or optical fiber 32 and collimated or focused by either microlens 24 or microlens 34 according to the teachings herein. According to variations of the invention that will be obvious to those skilled in the art in view of the disclosure herein, various devices may be interposed between passive micro-module 10 and second passive micro-module 50. Such interposed devices may include for example, a fiber pigtail (not depicted) for transmitting an optical signal between the micro-modules.

Optionally, the optical signal is also passed through micro isolator 52, which, as the name implies, is a compact optical isolator. Although only one micro isolator is depicted, more than one micro isolator or other optical elements such as optical filters, waveplates, or combinations thereof may be used on either micro-module as desired. Generally, an optical isolator is a device that uses a short optical transmission path to accomplish isolation between elements of an optical device. Generally, an optical isolator is used in a typical TOSA embodiment of the present invention to counter the effects of backreflections, which would otherwise negatively impact a laser diode. Backreflections are reflections of the laser beam, which are generally an aggregation of the reflections caused by the individual components within a TOSA that are reflected back into the laser cavity. Backreflections disturb the standing-wave oscillation in the laser cavity, increasing the effective noise floor of the laser. A strong backreflection causes certain lasers to become wildly unstable and completely unusable in some applications. Backreflections can also generate nonlinearities in the laser response which are often described as kinks. Most analog applications and some digital applications cannot tolerate these degradations.

Most often the determining factor in the magnitude of backreflections is how well the laser output is imaged onto the fiber surface, and how tightly the fiber is coupled to a laser diode. Since the fiber inserted in the TOSA is not AR coated, the reflection from the surface of the fiber constitutes a strongly coupled light back into the laser unless the fiber is a special fiber that is not polished flat. Other optical components, such as isolators and windows, in the TOSA also contribute to reflections back towards the laser if their surfaces are not AR coated. Some lasers such as FP lasers are not particularly susceptible to feedback, but other DFB lasers and EMLs are particularly are very sensitive to laser feedback.

Reference is now made to FIGS. 3A and 3B, which present side and top block diagrams of an optical sub-assembly laser mount having an integrated microlens (transmitting sub-module), designated generally at 100. Such sub-modules can be incorporated with passive micro-modules as explained in greater detail below. The transmitting sub-module 100 includes a laser diode 102 mounted upon a laser substrate or submount 104. As with submount 12, laser submount 104 is preferably formed of silicon. Of course, one skilled in the art will recognize that various embodiments of the invention may have differing details, including different methods of production, and may therefore not necessarily require the submount to be silicon.

Although laser diode 102, which may be an electroabsorptive modulated laser (EML), a DBF laser, a FP laser or the like, is the preferred light signal emitter according to the invention, it will be appreciated that other edge emitting light sources, such as for example CD lasers may be compatible with embodiments of the invention. Light emitters convert an electrical signal into a corresponding light signal that can be coupled into a fiber or focused onto the relevant medium, such as in optical storage applications, where the focused laser beam is used to read or record optical information on a disk or other optical medium. The light emitter is an important element because it is often the most costly element in the system and its characteristics often strongly influence the final performance limits of a given link or optical system. Among the key characteristics of light emitters is their numerical aperture and the resulting emission pattern, depicted in FIGS. 3A and 3B at 106. The emission pattern affects the amount of light that can be coupled into the optical fiber because a broad emission pattern means that the coupling lens system needs to have high enough magnification to convert the high NA of the laser to match the NA of the optical fiber, or otherwise a large amount of the emitted light does not enter the optical fiber. The percentage of emitted light that enters an optical fiber is referred to as the coupling efficiency. Thus, ideally the size of the emitting region should be minimal to maximize the coupling efficiency with a reasonable size optics, at reasonable size distance from the light source, with reasonable aberration correction for the effective NA of the lens used.

Also mounted upon submount 104 is an optional back monitor 108, which may be for example a rear facet monitor photodiode or a wavelength locker, which monitors the intensity of light emitted by laser diode 102 as well as the signal wavelength. The monitored light signal is received from a back facet of laser diode 102 or from a siphoned portion of the laser light. While monitoring the light signal emitted by laser diode 102, back monitor 108 provides feedback to laser diode 102 or other devices in the optical assembly to adjust the optical signal as needed. Greater details regarding back monitors, are provided below in the discussion related to wavelength lockers.

Also mounted upon submount 104 is lens holder 110. Lens holder 110 is attached to submount 104, for example by a solder, and provides the proper focal distance between laser diode 102 and microlens 116 through its z-axis positioning. This is accomplished by precisely aligning lens holder 110 so that the lens holder has a mounting surface 112 at a selected distance from the light emitting surface 114 of laser diode 102. Thus, the z-axis alignment of microlens 116 is provided during assembly of the transmitting sub-module 100 and thereby eliminates any later z-axis alignment for microlens 116. Because the curvature of each microlens could vary due to lens process variations, the z-axis alignment of each lens holder is customized for the curvature variance in individual lenses. The curvature of each microlens is therefore measured before the lens the assembly of the microlens subassemblies, most commonly as a Quality Assurance parameter during the wafer level lens manufacturing process.

Similar to the embodiment depicted in FIG. 1, microlens 116 may be formed as part of an aspheric microlens array as disclosed hereinabove according to reflow processes. Such a microlens also may have a rectangular shape with a light transmitting portion having a curved section 118 of the lens at one end of microlens 116 and a mounting surface 119 at the opposing end of microlens 116. In the depicted embodiment the microlens has a curved section 118 on only one surface thereof, with an opposing flat surface 121. Curved section 118 is an aspheric curve having a center of curvature that is aligned with the emission point of the light emitter. In various embodiments, the light transmitting portion of microlens also has an antireflective coating applied on each of curved section 118 and opposing flat surface 121. Thus, mounting surface 119 of microlens 116 is attached to lens holder 110 while curved section 118 of microlens 116 is aligned with laser diode 102 and has an antireflective coating thereon. Attachment of microlens 116 to lens holder 110 can be enhanced by attaching a metal coating to mounting surface 119 of microlens 116. The metal coating can be effectively soldered or otherwise affixed to lens holder 110. As previously mentioned, microlens 116 collimates the light signal received from laser diode 102. Such collimated light can be either coupled directly to an optical fiber or directed to another lens, such as a ball lens, prior to direction into the optical fiber or focusing onto the relevant medium. One or more optical isolators may receive the light signal prior to its introduction into the optical fiber.

The z-axis alignment is individualized for each microlens 116 by measuring the radius of curvature of each microlens curved section 118 and calculating the corresponding focal length, or z distance. Selecting the right z-axis alignment ensures a desired collimation of the light. Preferably, each microlens is measured and a map of each lens's focal lengths is provided prior to the assembly of the optical subassembly.

Figure 4:
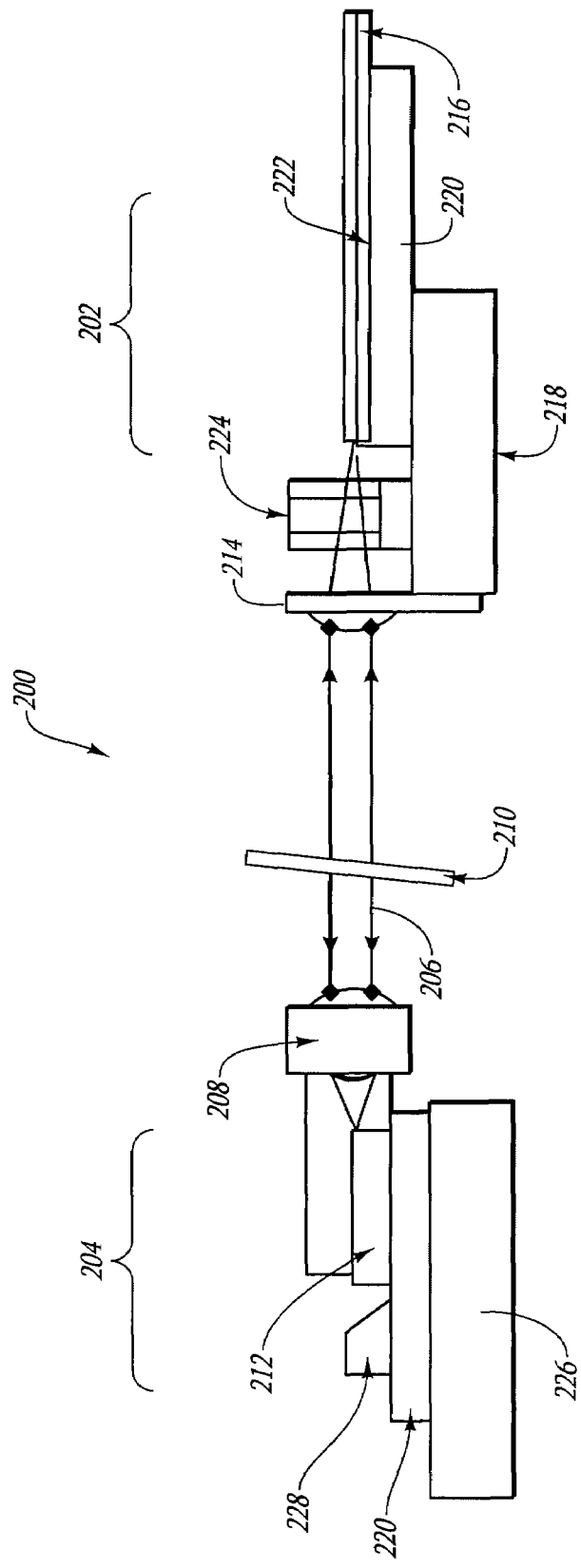
FIG. 4 is yet another schematic diagram that illustrates aspects of an optical micro-module according to embodiments of the invention.

Referring now to FIG. 4, a light coupling sub-module 202 and a transmitter optical micro-module 204 may be incorporated into a larger optical subassembly, depicted generally at 200. The optical subassembly 200 may be incorporated, for example as part of a transmitter optical subassembly (TOSA), as well as part of a variety of the other optical assemblies currently known in the art or as will become known or be developed hereafter.

In the depicted embodiment, after collimated light 206 exit microlens 208, it optionally passes through can window 210. Can window 210 is a feature of an optional hermetically sealed transistor outline can (not depicted), which protects various optical and electronic devices, including laser diode 212 and microlens 208, from the environment. In the depicted embodiment can window 210 is transparent and has no effect upon collimated light 206.

The collimated light 206 then impacts microlens 214, which focuses and couples collimated light 206 into optical fiber or fiber stub 216, which in the depicted embodiment is seated in silicon v-groove 222. As previously, described with respect to microlens 116, microlens 214 is set at the proper z-axis and optical axis alignment with respect to optical fiber 216 by the position of lens holder 218 on submount 220. Optionally, the light is also passed through micro isolator 224.

Whereas conventional transmitter optical subassemblies use aspherical glass lenses, which are small double aspherical surface lenses that focus the light received from a laser into an optical fiber, the present invention uses microlens 214 for the same purpose. Both aspherical glass lenses and microlens 214 must be carefully aligned at the proper focal length from an optical fiber during the manufacture of a TOSA. In contrast to bulk aspherical glass lenses, however, as previously explained with respect to microlens 24, this alignment can be performed at the wafer level, simplifying the manufacturing process. Of course, various embodiments of the invention may use a ball lens in addition to the microlens.

One challenge of optimizing optical data transmission technology is the need to have precise control over the transmission or carrier wavelengths. Such control over the carrier wavelengths is necessary in order to provide stable communication. Problems in wavelength division multiplexing (WDM) systems, for example, occur when one or more of various multiple wavelength signals in an optical fiber begin to drift and thereby interfere with other carrier wavelengths. The need to monitor the carrier wavelengths becomes more important as the channel spacing becomes closer.

Wavelength drift can occur for a variety of different reasons, for example when optical elements within a WDM system experience a temperature variation. This is particularly true with lasers, whose transmission wavelength is affected by temperature. Accordingly, embodiments of the invention may mount laser submount 104 on a thermo-electric cooler (TEC) 226 that is designed to keep the laser at a fairly constant temperature. The wavelength generated by the laser can be controlled by adjusting the drive current of TEC 226.

The age of a particular laser also has an impact on wavelength drift. As a laser ages, the output wavelength changes. Regardless of why the wavelength of a laser changes, however, it is necessary to ensure that the wavelength remains relatively constant. To achieve this goal, embodiments of the invention implement a feedback loop that is used to correct the wavelength being generated by the laser. In order to monitor the laser, a small portion of the laser output is siphoned off and sent to an optical element that can identify the wavelength of the laser light. One such optical element is back monitor 228, which received the laser output directly from a back facet of the laser rather than from a siphoned source. The output of the back monitor can be used to control the TEC, which controls the temperature of the laser and, ultimately, the wavelength of light emitted by the laser. One such back monitor is a wavelength locker.

Figure 5:
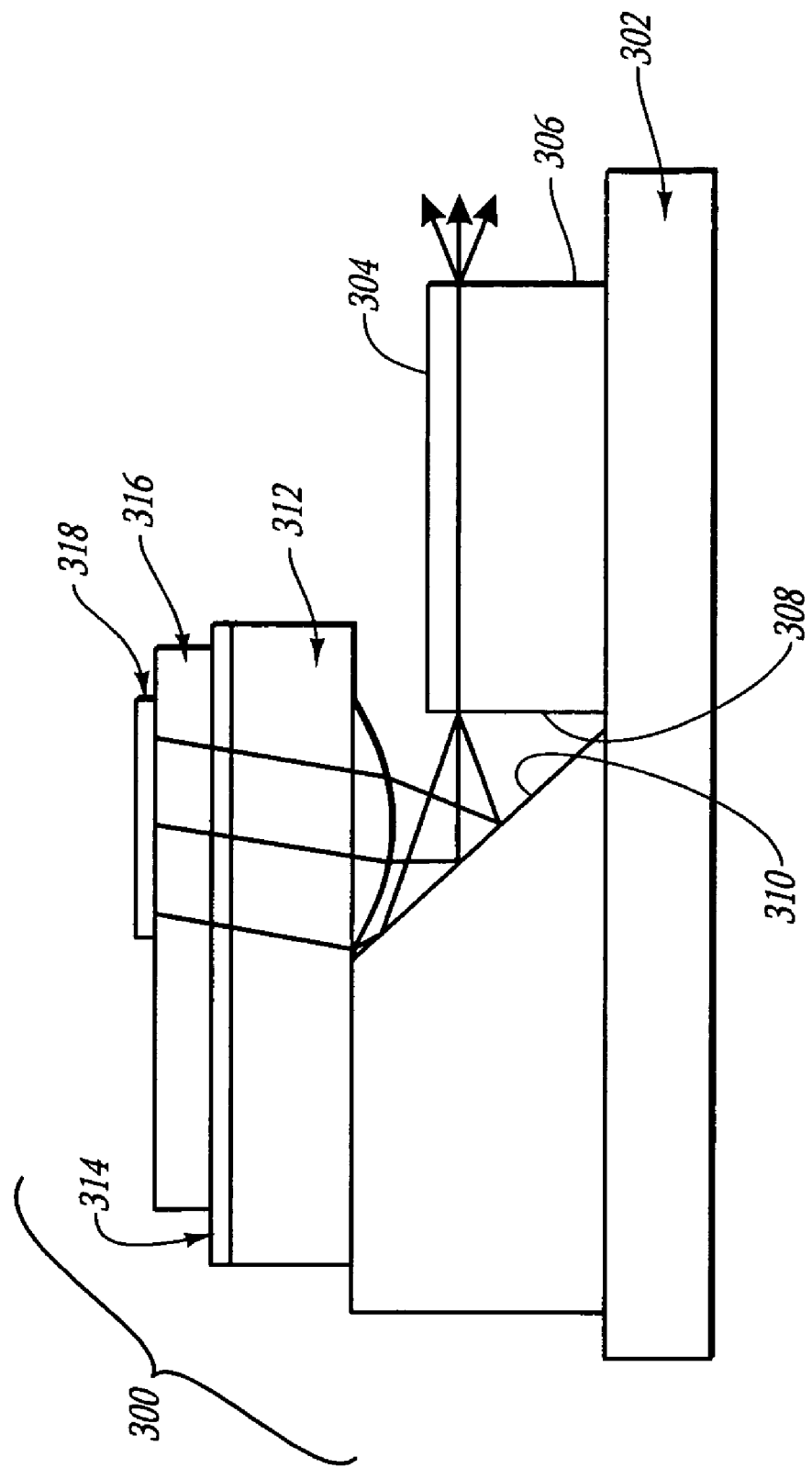
FIG. 5 is a schematic diagram that illustrates aspects of a wavelength locker for use with optical micro-modules according to embodiments of the invention.

Referring now to FIG. 5, depicted is a side view of a wavelength locker 300 according to the invention. As previously mentioned, the temperature of the laser can only be adjusted appropriately after determining the transmission wavelength of the laser. Functionally, this is achieved according by using wavelength locker 300 to determine the wavelength of the emitted light and adjusting the temperature of the laser as needed. Wavelength locker 300 also monitors the power of a laser.

Accordingly, adjacent wavelength locker 300 on submount 302 is a laser diode 304. The laser diode 304 may be any suitable light source including, but not limited to, an EML, a DBF laser, a FP laser, and the like. The laser diode 304 includes a front facet 306 and a back facet 308. The laser light exiting the front facet 306 is launched into a microlens as disclosed herein and on to, for instance, an optical fiber. The wavelength locker 300 utilizes the laser light exiting the back facet 308 of the laser diode 304, or received from a separate light siphon, to monitor the wavelength of the laser and/or the power of the laser.

The laser diode 304 is mounted on a thermoelectric cooler (TEC). Depending on the actual wavelength emitted by the laser diode 304, a controller will cause the TEC to alter the temperature of the laser diode 304, thereby altering the transmission wavelength of the laser diode 304. The controller makes a decision based on the wavelength detected by the wavelength locker 300.

In this example, the wavelength locker 300 includes a prism 310 (or other mirror or reflective element), one or more collimating lenses 312, a filter 314, a detector substrate 316 and one or more detectors 318. The laser light that exits the back facet 308 of the laser diode 304 is reflected by the prism 310 towards the lens 312. The lens 312 collimates the laser light and enables the light to be focused at a specific angle on the filter 314. In addition, using the lens 312 to direct or collimate the laser light can reduce or eliminate the averaging effect of having the laser light directed at the filter from multiple incident angles. The lens 312 can be adjusted in position to improve the response of the wavelength locker 300. Lens 312 may comprise a silicon microlens similar in construction to microlens 116 discussed in conjunction with FIGS. 3A and 3B.

The lens 312, as previously indicated, reduces the number of incident angles of light on the filter 314 such that the filter 314 is not compromised. The detector 318 may be a photodiode that can convert the laser light into a measurable electrical signal.

Figure 6:
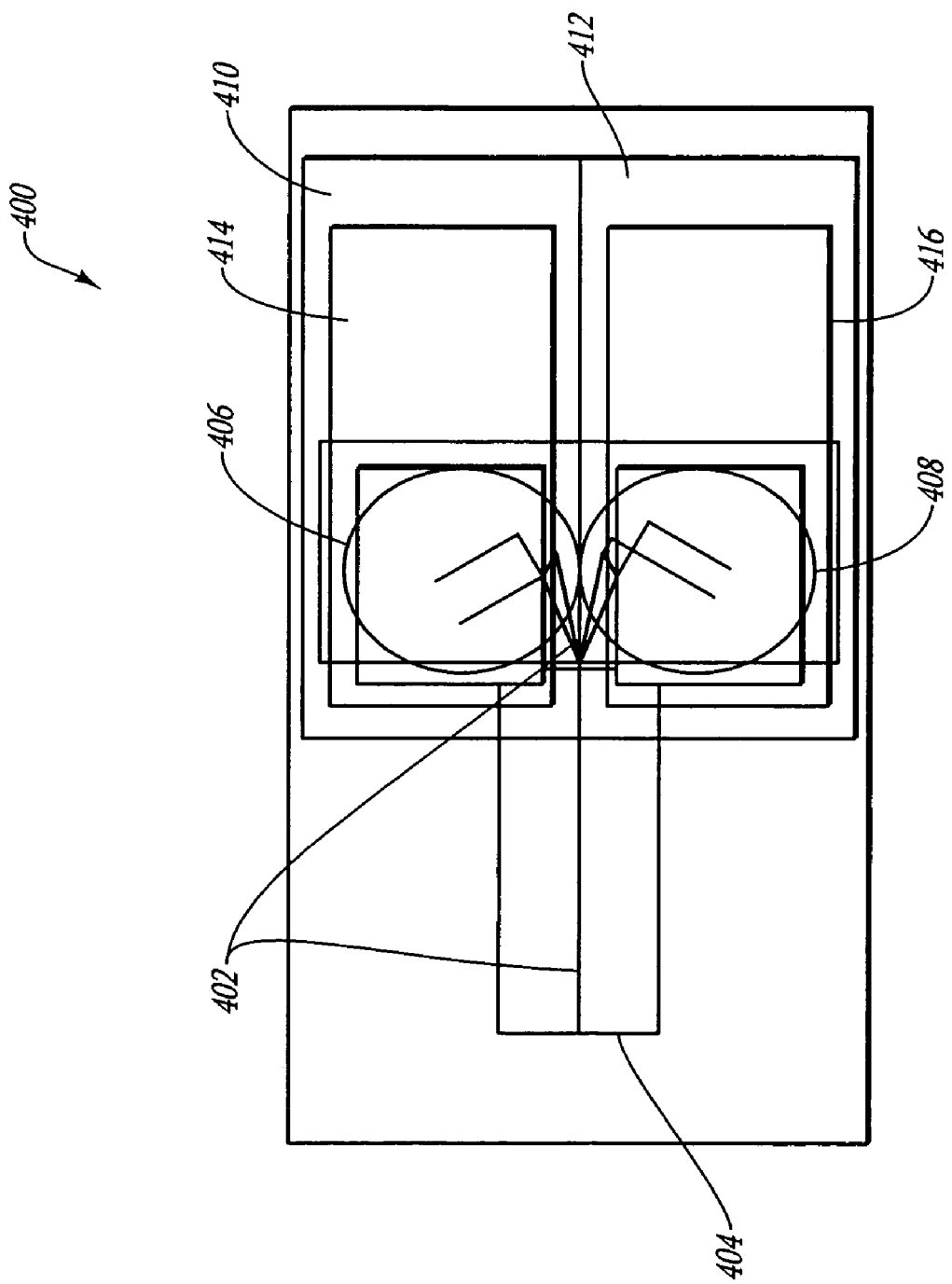
FIG. 6 is another schematic diagram that illustrates aspects of a wavelength locker for use with optical micro-modules according to embodiments of the invention.

Referring now to FIG. 6, a top view of wavelength locker 400 is presented to illustrate further features of the functioning of the herein disclosed wavelength lockers. Accordingly, as a light signal 402 exits laser diode 404, the light signal 402 experiences its characteristic spread or emission pattern. The light signal 402 in its emission pattern reflects off a prism (not depicted) and reflects upward toward first and second microlenses 406, 408 (see lens 312 in FIG. 5). First and second microlenses collimate the light impingent thereupon so that it contacts complimentary filters 410, 412 at a uniform angle (in some embodiments one filter can be omitted). Light signal 402 thus is divided into separate beams that pass through lenses 406, 408 and filters 410, 412 and contacts power monitor 414 or wavelength locker sensor 416. Depending on the selection of filters and steadiness of the optical power, the wavelength and/or optical power of the light signal 402 can be obtained from one of sensors 414 and 416 or by adding or subtracting the output from the sensors 414 and 416.

Other details and features of compatible wavelength lockers are disclosed in U.S. patent application Ser. No. 10/700,306 to Mina Farr, bearing Workman Nydegger docket No. 15436.84.1, incorporated herein by reference.

Figure 7:
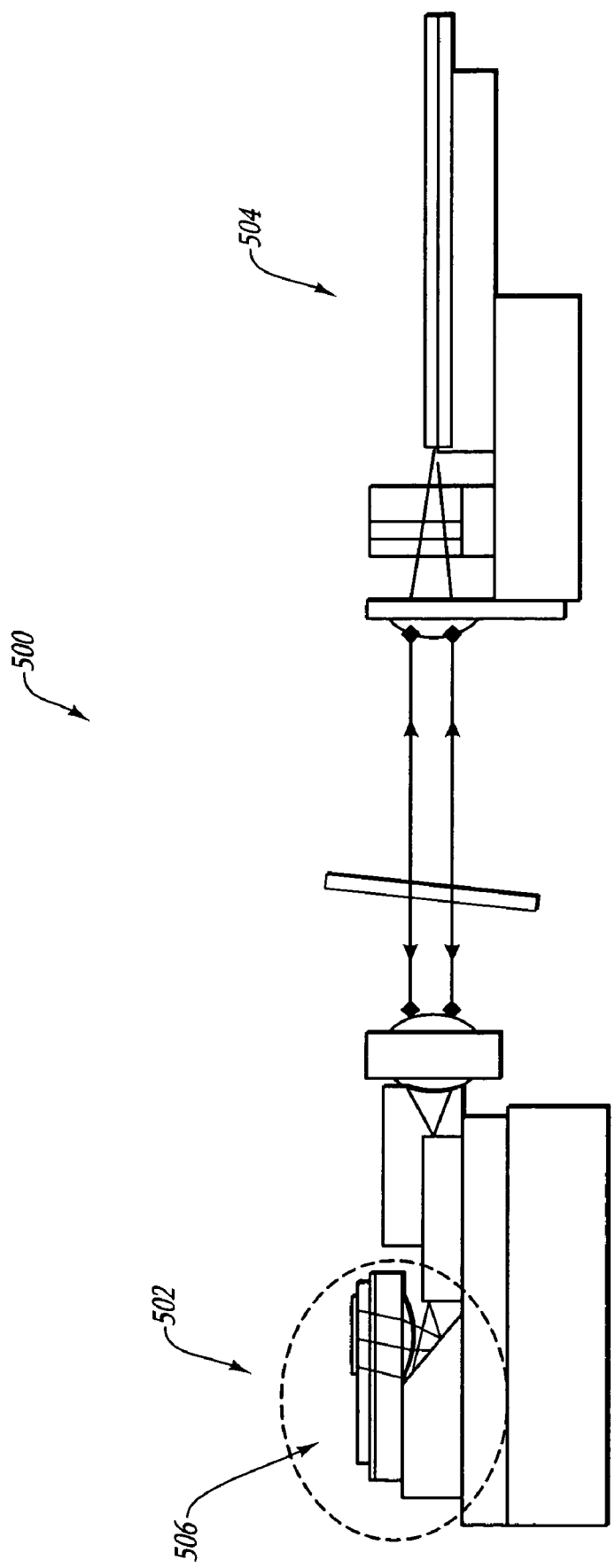
FIG. 7 is another schematic diagram that illustrates aspects of an optical micro-module according to embodiments of the invention.

Referring now to FIG. 7, an optical micro-module, designated generally at 500, includes a transmitter sub-module 502 and a light coupling sub-module 504. Transmitter sub-module 502 and light coupling sub-module 504 are constructed similarly to transmitter micro-module 204 and light coupling sub-module 504, except that transmitter sub-module 502 includes wavelength locker 506 in lieu of a conventional back monitor. Wavelength locker 506 is as described hereinabove with respect to wavelength lockers 300 and 400.

Figure 8B:
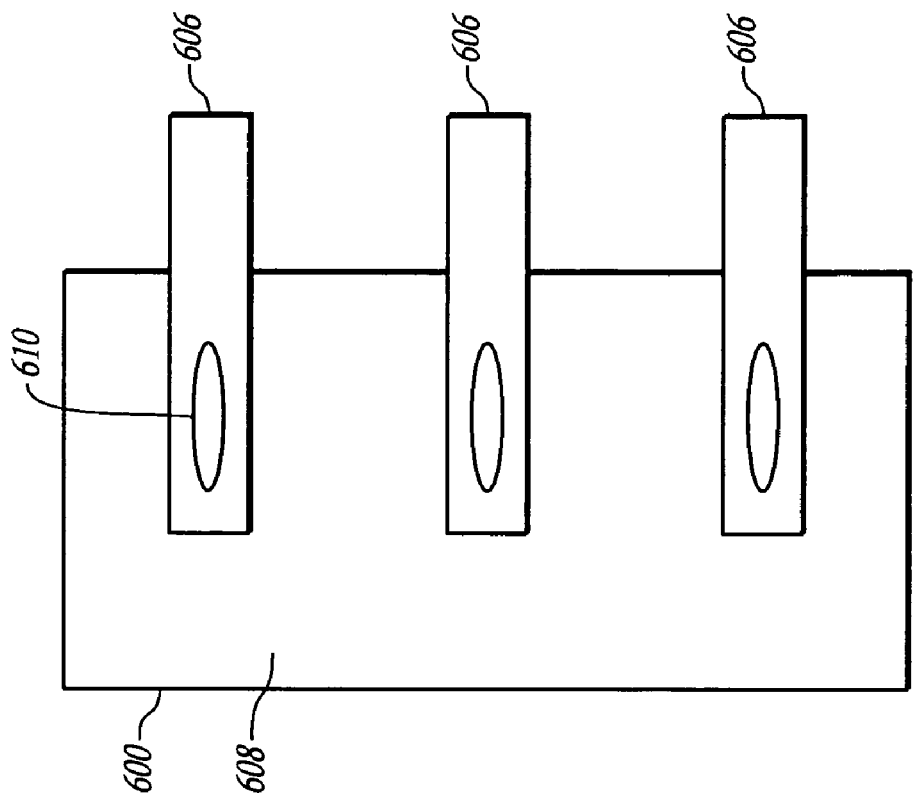
FIG. 8B is another schematic diagram that illustrates aspects of a method of assembling an optical micro-module according to embodiments of the invention.
Figure 8A:
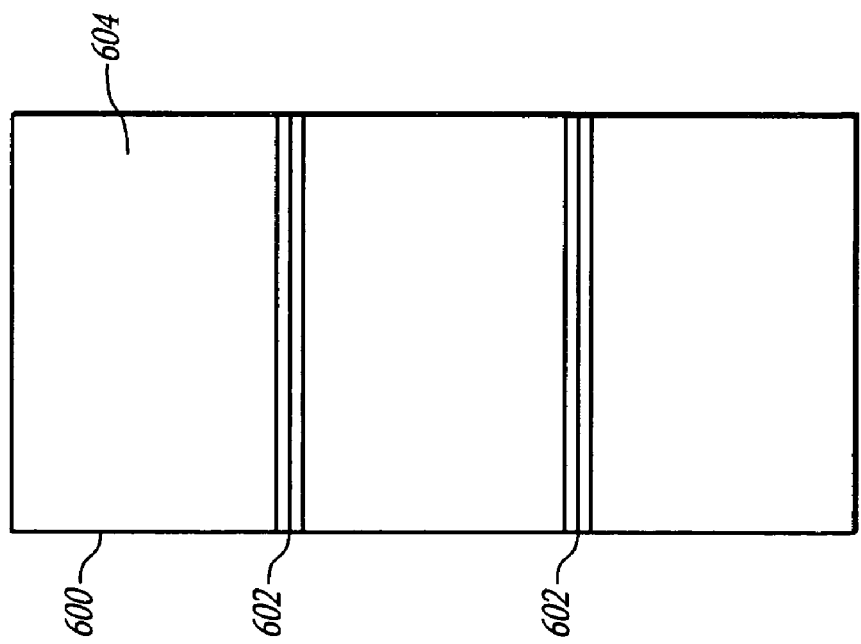
FIG. 8A is a schematic diagram that illustrates aspects of a method of assembling an optical micro-module according to embodiments of the invention.

Reference is now made collectively to FIGS. 8A to 8D, which illustrate one method of manufacturing optical micro-modules according to embodiments of the invention. A silicon wafer is first prepared. As depicted in FIG. 8A, the silicon wafer is cut into micro-module rows 600. Either before the wafer is cut into micro-module rows or at any point thereafter, one or more silicon v-grooves 602 are formed on a first surface 604 of the wafer by methods known in the art.

Next, as depicted in FIG. 8B, lens holders 606 are next aligned in the z-axis direction and mounted onto a second surface of micro-module row 600. Each lens holder 606 is preferably soldered into place on second surface 608 as indicated by numeral 610. By aligning each lens holder 606 in the z-axis, the focal length alignment for subsequently attached microlenses can be avoided. The desired z-axis placement is dependent on the characteristics of the particular microlens that will be attached.

Figure 8D:
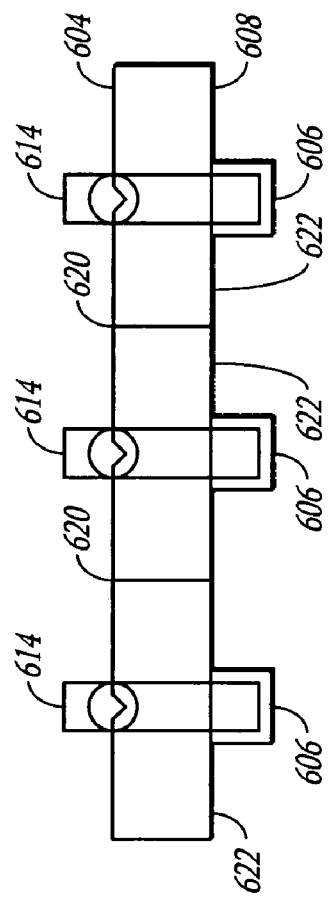
FIG. 8D is another schematic diagram that illustrates aspects of a method of assembling an optical micro-module according to embodiments of the invention.
Figure 8C:
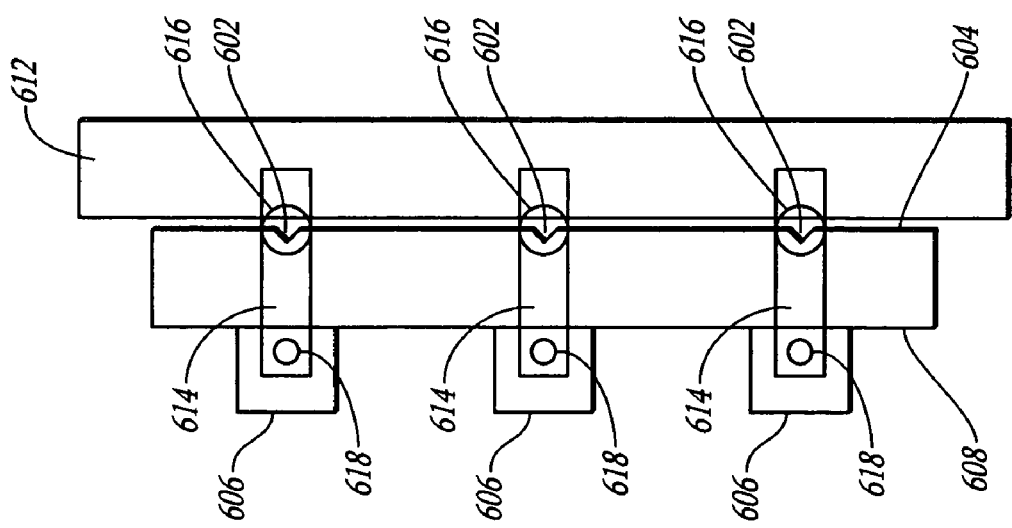
FIG. 8C is another schematic diagram that illustrates aspects of a method of assembling an optical micro-module according to embodiments of the invention.

Referring now to FIG. 8C, each micro-module row 600 is then placed on a vertical holding assembly 612 in preparation for receiving the lenses. The micro-module row 600 is then turned 90 degrees, for illustrative purposes, and each microlens 614 is positioned on a corresponding lens holder 606. As illustrated in FIG. 8C, bulls eye patches 616 referencing to the center of the microlenses are positioned on the side of the microlens holder, directly above the center of the fiber in the silicon v-groove 602. Of course, the alignment can be performed with or without a bulls eye patch or other similar indicators. Each microlens 614 is aligned in the x and y axis, preferably with the assistance of a camera or other visual or automatic control device, and soldered into place, as indicated by solder 618. Finally as indicated in FIG. 8D, micro-module rows 600 are flipped back horizontally and scribed at cut line 620 to break into individual micro-modules 622.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

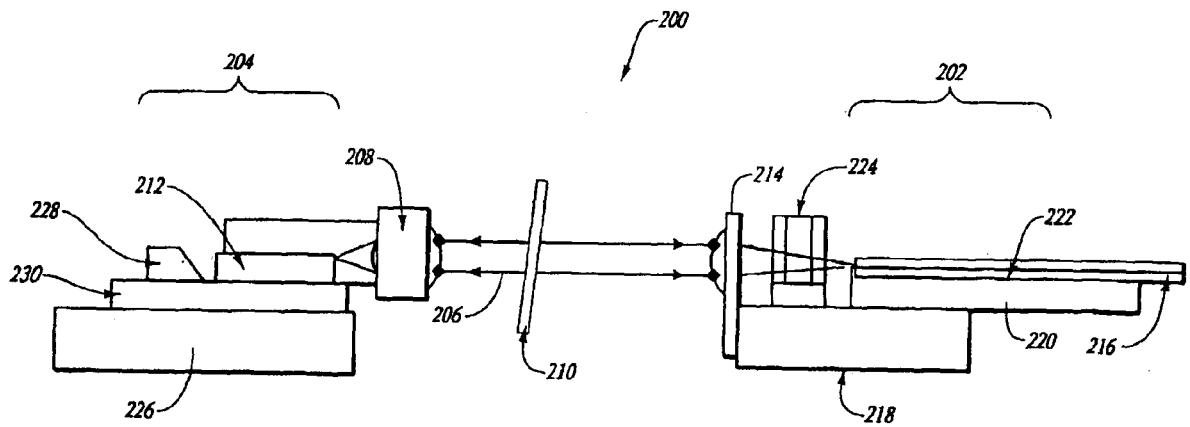

What is claimed is:

1. A transmitter optical micro-module comprising:
   a transmitter sub-module comprising:
      a light emitter mounted upon a silicon substrate;
      a lens holder mounted upon the silicon substrate adjacent the light emitter, the lens holder having a mounting surface;
      a lens attached to the mounting surface of the lens holder at a desired focal distance from the light emitter for receiving an emitted optical signal from the light emitter and collimating the optical signal; and
      a back monitor positioned adjacent a back facet of the light emitter for monitoring the wavelength and/or power of the light emitted by the light emitter; and
   a light coupling sub-module comprising:
      a submount comprising a silicon substrate, the submount being in mechanical communication with an optical fiber receptacle;
      a lens holder attached to the submount, the lens holder having a mounting surface; and
      a microlens comprising:
         a mounting surface; and
         a curved section having an optical axis;
      wherein the microlens mounting surface is attached to the lens holder mounting surface and the optical axis is aligned with the optical fiber receptacle such that, when an optical fiber is connected to the optical fiber receptacle, an optical signal can be effectively created by the light emitter, received by the microlens, and coupled into the optical fiber.

2. An optical micro-module as defined in claim 1, wherein the back monitor comprises:
   a reflective surface that receives light from a back facet of the light emitter and redirects the light;
   a first lens that receives a first portion of the redirected laser light reflected by the reflective surface, wherein the first lens collimates the laser light;

a second lens that receives a second portion of the redirected laser light reflected by the reflective surface, wherein the second lens collimates the laser light;

a filter layer that receives the collimated light from at least one of the first lens and the second lens; and a detector selected from the group consisting of a power sensor and a wavelength sensor, wherein the detector receives light through the filter to detect a signal and wherein at least one of the light power or light wavelength is determined from the signal.

3. An optical micro-module as defined in claim 1, further comprising a micro isolator attached to the submount to prevent backreflections from interfering with the operation of the light emitter.

4. An optical micro-module as defined in claim 1, wherein the microlens mounting surface has a metal coating thereupon and the metal coating is soldered to the lens holder mounting surface, thereby affixing the microlens to the lens holder.

5. An optical micro-module as defined in claim 1, wherein the microlens comprises an aspheric silicon microlens.

6. An optical micro-module as defined in claim 1, wherein:

the submount has a silicon v-groove thereon; and the optical fiber is attached to the silicon v-groove.

\* \* \* \* \*

UNITED STATES PATENT AND TRADEMARK OFFICE
CERTIFICATE OF CORRECTION

PATENT NO.       : 7,422,377 B2                                                    Page 1 of 3
APPLICATION NO.  : 10/882448
DATED            : September 9, 2008
INVENTOR(S)      : Farr It is certified that error appears in the above-identified patent and that said Letters Patent is hereby corrected as shown below:

Drawings
Figure 4, replace the figure with the figure herein depicted wherein the leftmost reference, submount 220 has been modified to submount 230.

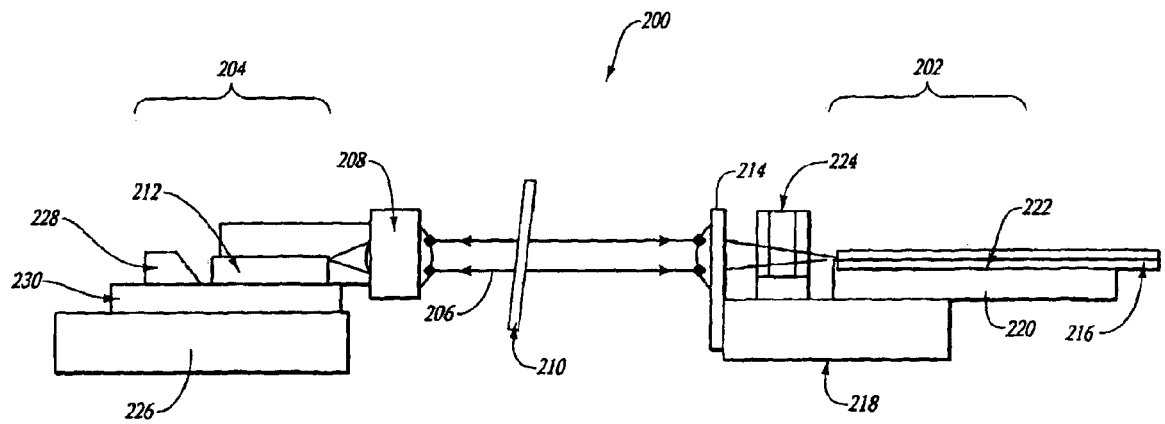

Fig. 4

Column 2
Line 65, change "that a lens optical axis" to --that the lens optical axis--

Column 4
Line 35, change "transmitted coupling" to --transmissive coupling--

Column 5
Line 30, change "passives collimated geometry" to --passive collimated geometry--

Signed and Sealed this

Twenty-third Day of November, 2010

David J. Kappos
*Director of the United States Patent and Trademark Office*

Column 6
Line 8, change "microlens 24 is formed" to --microlens 24 is that it is formed--

Column 7
Line 13, change "coating may formed" to --coating may be formed--

Column 9
Line 1, change "before the lens the assembly" to --before the assembly--
Line 47, change "collimated light 206 exit" to --collimated light 206 exits--

Column 10
Line 24, change "laser submount 104" to --laser submount 230--

Column 11
Line 30, change "light signal 402 in its emission pattern" to --light signal's emission pattern--
Line 32-33, change "First and second microlenses collimate" to --First and second microlenses 406, 408 collimate--
Line 51-52, change "light coupling sub-module 504" to --light coupling sub-module 202--

CERTIFICATE OF CORRECTION (continued) …

(12) United States Patent
Farr

(10) Patent No.: US 7,422,377 B2
(45) Date of Patent: *Sep. 9, 2008

(54) MICRO-MODULE WITH MICRO-LENS

(75) Inventor: Mina Farr, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 10/882,448

(22) Filed: Jun. 30, 2004

(65) Prior Publication Data

US 2004/0264856 A1 Dec. 30, 2004

Related U.S. Application Data

(60) Provisional application No. 60/483,741, filed on Jun. 30, 2003.

(51) Int. Cl.
G02B 6/36 (2006.01)

(52) U.S. Cl. ............................ 385/92; 385/76; 385/93
(58) Field of Classification Search ............... 372/101; 385/92–93, 76
See application file for complete search history.

(56) References Cited

U.S. PATENT DOCUMENTS

| | | | |
|---|---|---|---|
| 3,725,817 A | | 4/1973 | Nolan |
| 4,156,206 A | * | 5/1979 | Comerford et al. ......... 372/108 |
| 4,583,227 A | | 4/1986 | Kirkby |
| 4,716,568 A | | 12/1987 | Scifres et al. |
| 4,991,921 A | | 2/1991 | Suzuki et al. |
| 4,998,256 A | * | 3/1991 | Ohshima et al. ............ 372/32 |
| 5,127,072 A | * | 6/1992 | Blauvelt et al. ............ 385/88 |
| 5,319,435 A | | 6/1994 | Melle et al. |
| 5,469,265 A | | 11/1995 | Measures et al. |
| 5,561,684 A | | 10/1996 | Martin |
| 5,668,825 A | | 9/1997 | Karpinski |
| 5,751,877 A | * | 5/1998 | Ishizaka et al. ............ 385/93 |
| 5,812,581 A | | 9/1998 | Cox |
| 5,845,031 A | * | 12/1998 | Aoki ........................ 385/92 |
| 5,854,867 A | * | 12/1998 | Lee et al. .................. 385/49 |
| 5,963,686 A | | 10/1999 | Zheng et al. |
| 5,978,401 A | | 11/1999 | Morgan |
| 6,101,210 A | * | 8/2000 | Bestwick et al. ............ 372/96 |
| 6,122,301 A | | 9/2000 | Tei et al. |
| 6,289,028 B1 | | 9/2001 | Munks et al. |

(Continued)

FOREIGN PATENT DOCUMENTS

JP 2002328204 A * 11/2002

Primary Examiner—Minsun Harvey
Assistant Examiner—Phillip Nguyen
(74) Attorney, Agent, or Firm—Workman Nydegger

(57) ABSTRACT

Optical micro-modules include an integrated lens holder and microlens for passive coupling of optical signals into an optical fiber. The microlens includes a mounting surface and a curved section having an optical axis. The microlens curved section may be an aspheric silicon lens. The microlens mounting surface is attached to the lens holder mounting surface such that the microlens optical axis is centered with the optical fiber and aligned at a desired focal length from the optical fiber. The lens holder may, for example, be either in mechanical communication with a cable receptacle or be attached to a submount that has a silicon v-groove thereon for receiving an optical fiber. The optical micro-module may be part of other optical devices, for example a transmitter optical sub-assembly or a receiver optical sub-assembly.

6 Claims, 9 Drawing Sheets